Aug. 9, 1927.　　　　　　　　　　　　　　　1,638,529
H. A. COOK
LUSTROUS, VARIEGATED, PLASTIC PRODUCT AND METHOD OF MAKING SAME
Filed Jan. 29, 1927
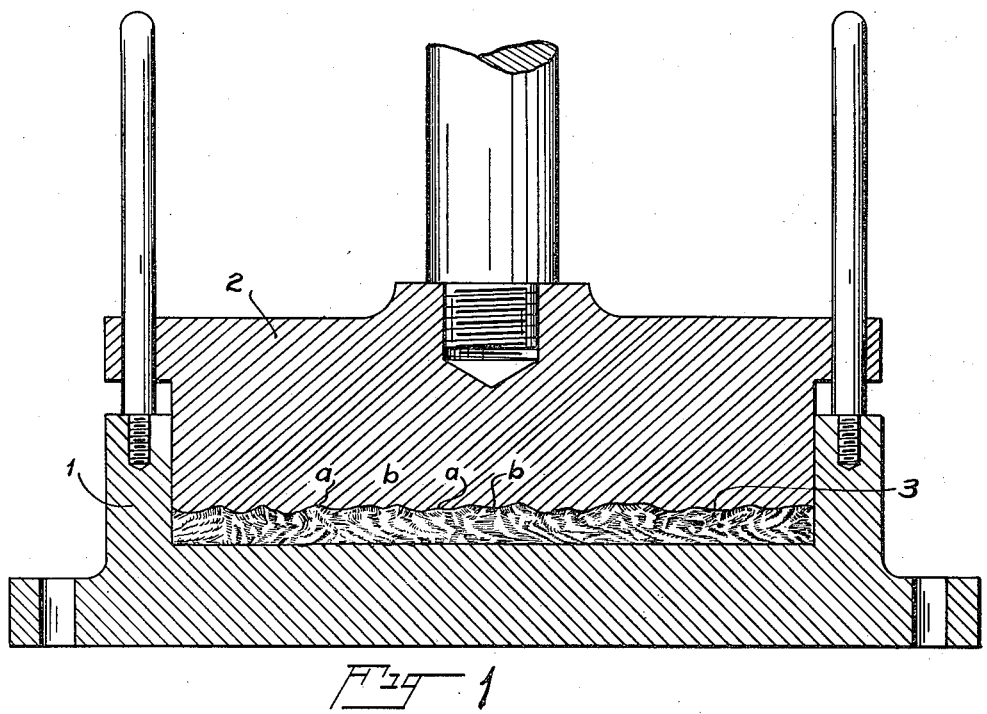
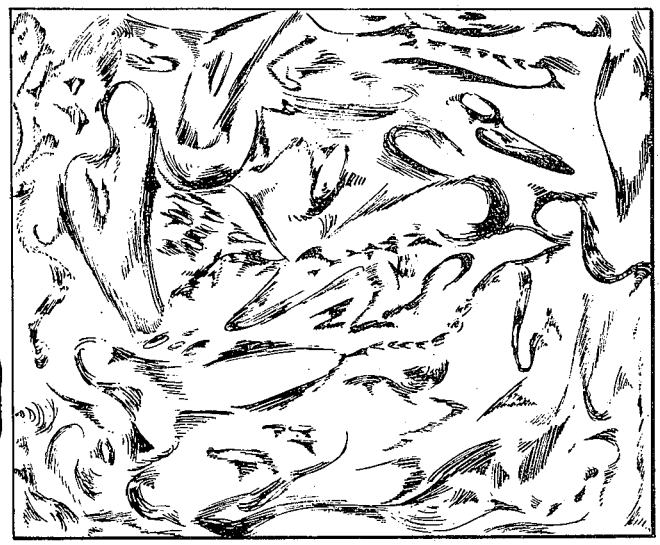
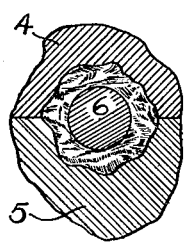
INVENTOR:
Herbert A. Cook,
BY
His ATTORNEY.

Patented Aug. 9, 1927.

1,638,529

UNITED STATES PATENT OFFICE.

HERBERT A. COOK, OF BLOOMFIELD, NEW JERSEY.

LUSTROUS, VARIEGATED, PLASTIC PRODUCT AND METHOD OF MAKING SAME.

Application filed January 29, 1927. Serial No. 164,527.

This invention relates to the production of lustrous, iridescent products and also various variegated colored products of celluloid, rubber, phenol-formaldehyde condensation products and the like and has for its particular objects the simple and effective control of the production of products of this character either in the form of slabs, rods, tubes or other desired shapes in order that the successive articles may be produced with a particular pattern or effect thereon of predetermined characteristics and all of which articles will be substantially uniform in lustre, sheen and appearance. Further objects of the invention are the elimination of the sharp contrasts and fault lines throughout surfaces of large areas when it is desired to produce a substantially continuous but wavy iridescent or lustrous shell-like effect unbroken by false fault lines or false fissures while withal, if desired, insuring that the successive articles produced shall have a uniform character and appearance. Other objects of the invention will be hereinafter set forth.

In the accompanying drawings in which I have illustrated a type of apparatus designed for carrying out my invention, Figure 1 is a vertical section of a die box and die showing a plastic product which has been subjected to the action of such die;

Fig. 2 is an empirical or diagrammatic or plan view, not however, intended as a faithful and accurate representation of the pattern or effect which would be produced by any particular die, designating a fanciful effect obtained by the subjecting a plastic, such as the imitation mother of pearl described and constituting the improvement of Patent No. 1,607,624, to my improved method of treatment;

Fig. 3 is intended to be a corresponding representation in section of the product obtained by subjecting a plurality of superimposed sheets or slabs of celluloid or rubber, the adjacent slabs being originally of a different color, say red and black for example, to my improved treatment and empirically showing the upsetting of the trend and homogeneous distribution of the color which existed in the original sheets; and Fig. 4 is a vertical cross-section of a tubular die suitable for producing my improved product.

My investigations have led to the discovery that mother of pearl, whether of the type described in the said Patent No. 1,607,624, wherein the pigment particles are disposed in an uni-directional trend or whether of the type of imitation mother of pearl heretofore produced, as referred to in said patent, is especially adapted for employment in the production of my new product.

Referring to the drawings, the reference numeral 1 designates a die box and 2 a die adapted to reciprocate with respect thereto and to be forced therein under great pressure. The lower face 3 of said die is, as shown, embossed or engraved to produce a multiplicity of raised portions $a$ and depressed portions $b$, the maximum difference between the varying levels of said surface or maximum elevation being not less than 1/64 of an inch in order to produce a distinct or marked upsetting or distortion of the structure or trend of the pigment particles of the material treated in the area below the point of maximum penetration of the raised portions of the die into such material.

In Fig. 3 in which I have illustrated the bizarre effect obtained by subjecting a multiplicity of sheets each of a different color to the action of an engraved or embossed die such as employed in Fig. 1, the reference letter $c$ designates the red portions of the product, $d$ the black portions and $e$ the portions wherein the color is some blend of these two colors.

In Fig. 4 in which is illustrated a split die of tubular shape for the production of tubes of my improved product, the reference numeral 4 designates the upper half and 5 the lower half of such die, each being engraved or embossed with any desired design or pattern and 6 is the mandrel which serves to support the plastic employed when it is desired to produce tubes. If rods are to be produced, a split die is likewise employed, but no mandrel is required.

Preferably, for the treatment of sheets or tubes of $1/8''$ in thickness, the variation between the lowest and highest points of the face of the die is about $\frac{1}{16}''$ though obviously when employing thicker slabs or sheets to obtain particular effects, this dimension can be materially exceeded or somewhat reduced.

In carrying out my invention, I preferably proceed as follows:—a pyroxylin plastic composition, such for example, as that commonly known to the trade as celluloid, is preferably first prepared as described in the Patent No. 1,607,624 so as to thoroughly incorporate therewith, as specified in said patent, the desired pigment, for example, fish scales, as well as to homogeneously distribute the pigment in a uniform directional trend throughout the mass. The lustrous, polished or calendered tubes directly obtained from the extruding operation, and without the further treatment described in said patent of stacking, cutting and pressing of a stack of such sheets to form a block, is introduced into a die of the construction herein described and subjected to a sufficient pressure to upset the trend of the pigment and the structure of the material to a point considerably beyond the point of extreme penetration of the face of the die into the upper face of the sheet treated. During the die pressing operation, of course, the material is heated sufficiently to render the same plastic so that the necessary upsetting of the structure and trend of the pigment in the structure can be insured, for example, a temperature of approximately 200° F., is desirable for this purpose.

Upon the completion of the pressing operation the article, either in the form of a sheet, tube, rod or the like, depending upon the particular configuration of die box and die employed, is removed from the die box and either subjected to a grinding, buffing, turning or polishing operation to remove partially or entirely the superficial pattern on the product removed from the mold to produce a smooth, continuous polished surface or a substantially smooth surface of different design and appearance from the pattern of the die employed.

In lieu of grinding or buffing the product removed from the die, the same may be subjected to a re-pressing operation in a second die having smooth, highly polished surfaces in order to still further upset the trend of the pigment or variegated color effects in the plastic which results from the first pressing operation and produces a smooth or substantially smooth, continuous or substantially unbroken surface in which the facets of the pigment employed or the layers or mottled portions of the mass however, will have a quite different appearance from that obtained by the grinding or buffing operation such as above described and yet be entirely different from the appearance of the plastic originally subjected to the first pressing action. It will be found that the characteristics and appearance of the finished product so obtained will be entirely changed from that possessed by the original so-called Higgins product which had been subjected to the aforesaid treatment and depending upon the character of the pattern or figure of the face of the die, there will have been produced a corresponding effect in the finished product which is entirely unique and uniform in successive articles produced in the same die.

Similarly, in lieu of subjecting the so-called Higgins product to my treatment, I may employ a plurality of superimposed sheets of rubber or phenol-formaldehyde condensation products, pyroxylin plastic or the like to my improved method of treatment, it being essential, of course, that some of the sheets so superimposed should be of a different color from an adjacent sheet in those cases where it is desired to produce a variegated color effect and no scale-like pigment has been incorporated in the material so treated. In this manner, it is possible to obtain spattered or even wave-like color effects on the surface of the finished product which is not only highly unique and interesting, but will be uniform in a succession of different articles produced from the same kind of material in the same die.

The exact control of the pattern or effect such as is possible by my improved method, renders it possible to obtain an indefinite number of articles of almost the identical appearance. This accomplishment is of the utmost importance commercially and so far as I am aware, no one has ever heretofore proposed the upsetting of the structure by virtue of the employment of an engraved or embossed die in which there is a relatively large difference in the elevation of the different portions thereof in order to produce, not a merely superficial effect, but a deep-seated structural change well beyond the point of penetration of the die face into the material treated.

The consistency of the mixture which is subjected to the pressing operation should be sufficiently thin at the temperatures employed to admit of the orientation or change of direction of the masses of the scale-like pigments therein under the influence of the roughened die face and at the same time should not be so thin that when the material is removed from the die, the pattern impressed thereon will vanish or substantially vanish because of the fact that the mass is not self-sustaining.

For some grades of pyroxylin plastics a temperature of 200° F. and a pressure of but 150 lbs. per sq. in. will be found to be suitable, but for other grades, the pressure up to 2,000 lbs. per sq. in. particularly when the pigment is not in the form of scales or flakes may be employed and under the higher pressures it will be found possible to employ a relatively lower temperature if desired, namely 150° F. without the plastic becoming too stiff or hard to flow into the deepest portions of the die face.

It is essential that the material under treatment in the roughened die should be confined approximately in situ as if it were to be extruded through a roughened die it would be impossible to obtain the requisite upsetting of the trend of the pigment particles to produce the desired effect herein described and claimed.

Furthermore, the pattern on the die may be coated with a binder and a suitable metallic or like pigment or color dusted or incorporated therewith and more or less of the same can be removed by a scraper or brush from the high spots to the actual employment of the die for the pressing operation and thus a filagree and mottled effect can be obtained.

If desired, and in accordance with the usual practice a relatively thick block or sheet obtained by the foregoing method of treatment can be planed or what is termed "sheeted" into a plurality of thin sheets each of which will, of course, differ somewhat in appearance from each other due to the difference in the trend or pigmentation of the mass at the different levels thereof, even though produced in the same die. Furthermore, although ordinarily the sheet or article as removed from the die is turned down to a smooth surface, I may buff or turn off but a part of the superficial patttern in the area penetrated by the die and then polish the entire article, thus producing a reticulated or like effect in addition to the bizarre effect produced as herein described in the area beneath the partially obliterated pattern.

Various changes in the proportions and conditions of operation from these herein described, may be made without departing from the spirit of my invention, as included within the scope of the appended claims.

Having thus described my invention, what I claim and desire to obtain by United States Letters Patent is:—

1. The method of producing ornamental effects in plastic compounds containing scale-like pigments which consists in subjecting the same while at an elevated temperature to the action of a die having a highly uneven impression surface, and then removing the principal portion of the superficial pattern impressed on the plastic and polishing the resultant surface of the plastic.

2. The method of producing ornamental effects in plastic compounds containing scale-like pigments which consists in subjecting the same while at an elevated temperature to the action of a die having a highly uneven impression surface, the extreme difference between the elevations of the highest and lowest portions of such surface exceeding 1/64 of an inch and then removing the principal portion of the superficial pattern impressed on the plastic and polishing the resultant surface of the plastic.

3. The method of making imitation mother of pearl which consists in subjecting a plastic containing scale-like pigment particles arranged in a generally uni-directional trend to the action, under high pressure, of a highly uneven impression surface of a die in which the irregularities are of sufficient depth to materially upset the trend of a considerable portion of such particles of pigment to a depth well below the point of maximum penetration of the die into the plastic and then superficially defacing the surface of the plastic to substantially entirely remove the impressed pattern and polishing such surface.

4. The method of making imitation mother of pearl which consists in subjecting a plastic containing scale-like pigment particles arranged in a generally uni-directional trend to the action, under high pressure, of a highly uneven impression surface of a die in which the irregularities are of sufficient depth, and at least 1/64 of an inch to materially upset the trend of a considerable portion of such particles of pigment to a depth well below the point of maximum penetration of the die into the plastic and then superficially defacing the surface of the plastic to substantially entirely remove the impressed pattern and polishing such surface.

5. The method of making ornamental tubular plastic compounds, which consists in subjecting a pigmented plastic while confined within a tubular die so as to be incapable of flowing therethrough to the action of a highly uneven impression surface on said die, and then removing a very substantial portion of the impressed pattern and finishing the resultant article.

6. The method of making a plurality of ornamental, tubular plastic compounds having a similar pattern of predetermined design formed therein, which consists in subjecting a plurality of masses of pigmented plastic composition while in a heated condition and while confined against longitudinal flow in a tubular die to the action of a highly uneven impression surface, the impression surface to which each separate mass of plastic material is subjected having substantially the identical pattern thereon as that to which any other mass of the same batch is subjected, then subjecting the masses of plastic material so obtained to a finishing operation to substantially entirely remove any superficial pattern to the depth of maximum penetration of the impression surface thereinto.

7. The method of making an ornamental plastic; which consists in subjecting a plurality of separate and differently colored layers of plastic material to the action of a highly uneven impression surface of a die, which surface has a pattern of predetermined design formed thereon and while maintaining the plastic at an elevated temperature, then removing substantially the entire pattern in the portion of the plastic to the depth to which the impression surface penetrated said plastic and finishing the surface of resultant product from which a portion of the outer surface has been removed.

8. An ornamental plastic having large masses of pigment flakes arranged in a uni-directional lay, and having the masses of pigment adjacent the surface considerably more upset from said uni-directional lay than those masses immediately beneath the same and more distant from said surface.

9. An imitation mother of pearl having masses of flake-like fish scales embedded therein, the portions of such fish scales more distant from one surface and being of a more uni-directional and of a different trend than those immediately adjacent such surface and said surface being substantially devoid of extensive, transparent, lineal faults or streaks of more than 1/64 of an inch in width.

10. An imitation mother of pearl having masses of flake-like fish scales embedded therein, the portions of such fish scales more distant from one surface and being of a more uni-directional and of a different trend than those immediately adjacent such surface and said surface being substantially devoid of extensive, transparent, rectilineal faults or streaks of more than 1/64 of an inch in width.

11. A tubular plastic of a predetermined ornamentation, the same containing large masses of scale-like pigment, portions of said pigment masses adjacent the outer surface being of trends which are upset to a substantial angle with respect to the circumference of said tube and other masses of said pigment considerably distant from said surface being of a trend essentially concentric with said tube.

Signed at New York, in the county and State of New York, this 25th day of January 1927.

HERBERT A. COOK.